(12) United States Patent
Hayashi et al.

(10) Patent No.: US 12,070,695 B1
(45) Date of Patent: Aug. 27, 2024

(54) CROSSWORD PUZZLE GENERATING APPARATUS AND CROSSWORD PUZZLE GENERATING METHOD

(71) Applicant: Ksquwave Inc., Tokyo (JP)

(72) Inventors: Masahiro Hayashi, Tokyo (JP); Yutaka Kurosu, Tokyo (JP)

(73) Assignee: Ksquwave Inc., Tokyo (JP)

( * ) Notice: Subject to any disclaimer, the term of this patent is extended or adjusted under 35 U.S.C. 154(b) by 0 days.

(21) Appl. No.: 18/565,370

(22) PCT Filed: Aug. 4, 2023

(86) PCT No.: PCT/JP2023/028611
§ 371 (c)(1),
(2) Date: Nov. 29, 2023

(87) PCT Pub. No.: WO2024/084780
PCT Pub. Date: Apr. 25, 2024

(30) Foreign Application Priority Data

Oct. 19, 2022 (JP) ................................. 2022-167727

(51) Int. Cl.
*A63F 13/80* (2014.01)
(52) U.S. Cl.
CPC .................................. *A63F 13/80* (2014.09)

(58) Field of Classification Search
CPC ....................................................... A63F 13/80
See application file for complete search history.

(56) References Cited

U.S. PATENT DOCUMENTS

2020/0391101 A1\* 12/2020 Lelkes .................. A63F 3/0423

FOREIGN PATENT DOCUMENTS

JP           H08309021 A       11/1996

\* cited by examiner

*Primary Examiner* — Thomas H Henry
(74) *Attorney, Agent, or Firm* — POLSINELLI PC

(57) ABSTRACT

A target area setting unit 1 sets a target area for placement of one word made up of an arbitrary number of characters, in a face of board that does not include black cells in an initial stage. A word placing unit 2 places, in the set target area, one word made up of an arbitrary number of characters falling within an area length of the target area. The target area is set at a position that secures a widest free area capable of placement of a next word without restriction owing to an existing character in a crossing cell and restriction owing to an existing character in an adjoining cell, in a remaining area except the target area and an existing area where a word has already been placed. Therefore, a larger number of words can be placed in such a manner that words are placed one by one while leaving a room for enlarging an area where a next word is freely placeable, as much as possible.

19 Claims, 6 Drawing Sheets

|   | 1 | 2 | 3 | 4 | 5 | 6 |
|---|---|---|---|---|---|---|
| 1 | A | P | A |   | U | S |
| 2 | I |   | B |   |   |   |
| 3 | M |   | L |   |   |   |
| 4 |   |   | E |   |   |   |
| 5 | I |   |   |   |   |   |
| 6 | T | C | P |   |   |   |

^A[A-Z]{4}P$
^A[A-Z]{0,3}$      CA1

|   | 1 | 2 | 3 | 4 | 5 | 6 |
|---|---|---|---|---|---|---|
| 1 | A | P | A |   | U | S |
| 2 | I |   |   |   |   |   |
| 3 | M |   |   |   |   |   |
| 4 |   |   |   |   |   |   |
| 5 | I |   |   |   |   |   |
| 6 | T | C | P |   |   |   |

CA2

|   | 1 | 2 | 3 | 4 | 5 | 6 |
|---|---|---|---|---|---|---|
| 1 | A | P | A |   | U | S |
| 2 | I |   |   |   |   |   |
| 3 | M |   |   |   |   |   |
| 4 |   |   |   |   |   |   |
| 5 | I |   |   |   |   |   |
| 6 | T | C | P |   |   |   |

|   | 1 | 2 | 3 | 4 | 5 | 6 |
|---|---|---|---|---|---|---|
| 1 | A | P | A |   | U | S |
| 2 | I |   | B |   |   |   |
| 3 | M |   | L | E | G |   |
| 4 |   |   | E |   |   |   |
| 5 | I |   |   |   |   |   |
| 6 | T | C | P |   |   |   |

^M[A-Z]{1}L[A-Z]{0,3}$
^L[A-Z]{0,3}$      CA1

|   | 1 | 2 | 3 | 4 | 5 | 6 |
|---|---|---|---|---|---|---|
| 1 | A | P | A |   | U | S |
| 2 | I |   | B |   |   |   |
| 3 | M |   | L |   |   |   |
| 4 |   |   | E |   |   |   |
| 5 | I |   |   |   |   |   |
| 6 | T | C | P |   |   |   |

|   | 1 | 2 | 3 | 4 | 5 | 6 |
|---|---|---|---|---|---|---|
| 1 | A | P | A |   | U | S |
| 2 | I |   | B |   | R |   |
| 3 | M |   | L | E | G |   |
| 4 |   |   | E |   | E |   |
| 5 | I |   |   |   | N |   |
| 6 | T | C | P |   | T |   |

^U[A-Z]{1}G[A-Z]{0,3}$
CA1

|   | 1 | 2 | 3 | 4 | 5 | 6 |
|---|---|---|---|---|---|---|
| 1 | A | P | A |   | U | S |   CA2
| 2 | I |   | B |   |   |   |
| 3 | M |   | L | E | G |   |
| 4 |   |   | E |   |   |   |
| 5 | I |   |   |   |   |   |
| 6 | T | C | P |   |   |   |

Fig. 11

|   | 1 | 2 | 3 | 4 | 5 | 6 |
|---|---|---|---|---|---|---|
| 1 | A | P | A |   | U | S |
| 2 | I |   | B |   | R |   |
| 3 | M |   | L | E | G |   |
| 4 |   |   | E |   | E |   |
| 5 | I |   |   |   | N |   |
| 6 | T | C | P |   | T |   |

CA1

|   | 1 | 2 | 3 | 4 | 5 | 6 |
|---|---|---|---|---|---|---|
| 1 | A | P | A |   | U | S |
| 2 | I |   | B |   | R |   |
| 3 | M |   | L | E | G |   |
| 4 |   |   | E |   | E |   |
| 5 | I |   |   |   | N |   |
| 6 | T | C | P |   | T |   |

CA2

|   | 1 | 2 | 3 | 4 | 5 | 6 |
|---|---|---|---|---|---|---|
| 1 | A | P | A |   | U | S |
| 2 | I |   | B |   | R |   |
| 3 | M |   | L | E | G |   |
| 4 |   |   |   | E |   | E |
| 5 | I |   |   | E | N | D |
| 6 | T | C | P |   | T |   |

|   | 1 | 2 | 3 | 4 | 5 | 6 |
|---|---|---|---|---|---|---|
| 1 | A | P | A |   | U | S |
| 2 | I |   | B |   | R |   |
| 3 | M |   | L | E | G |   |
| 4 |   |   | S | E |   | E |
| 5 | I |   |   | E | N | D |
| 6 | T | C | P |   | T |   |

^[A-Z]{0,1}E$

CA (b)

|   | 1 | 2 | 3 | 4 | 5 | 6 |
|---|---|---|---|---|---|---|
| 1 | A | P | A | ■ | U | S |
| 2 | I | ■ | B | ■ | R | ■ |
| 3 | M | ■ | L | E | G | ■ |
| 4 | ■ |   | S | E | ■ | E |
| 5 | I | ■ | ■ | E | N | D |
| 6 | T | C | P | ■ | T | ■ |

COMPLETION OF CROSSWORD PUZZLE

CROSSWORD PUZZLE GENERATING APPARATUS AND CROSSWORD PUZZLE GENERATING METHOD

CROSS REFERENCE TO RELATED APPLICATIONS

This application is a National Phase filing under 35 U.S.C. § 371 of PCT/JP2023/028611, filed on Aug. 4, 2023, which in turn claims priority to Japanese Application No. 2022-167727 filed on Oct. 19, 2022. The entire contents of each application are hereby incorporated by reference.

TECHNICAL FIELD

The present invention relates to a crossword puzzle generating apparatus and a crossword puzzle generating method. The present invention is particularly suitable for use in generating a crossword puzzle by placing a plurality of words lengthwise and widthwise on a face of board that has an arbitrary size and does not include black cells in which no characters are filled, in an initial stage.

BACKGROUND ART

A technique for automatically generating a crossword puzzle has conventionally been proposed (see, for example, Patent Literature 1). Patent Literature 1 discloses a basic algorithm. According to this algorithm, in a predetermined face of board where positions of black cells in which no characters are filled are determined in advance, a plurality of words each having a character string length designated in consideration of the positions of the black cells are selected from a word dictionary. Next, one word including the same character as that of an existing word which has already been filled, in a cell crossing the existing word is selected from among the plurality of selected words. The selected one word is then placed at a designated character string position.

CITATION LIST

Patent Literature
Patent Literature 1: JP H08-309021 A

SUMMARY OF INVENTION

Technical Problem

According to the foregoing technique disclosed in Patent Literature 1, a plurality of words are placed one by one on a predetermined face of board where positions of black cells in which no characters are filled are determined in advance. As a result, the number of characters of a word and a lengthwise or widthwise character string position at which the word should be placed are determined in advance. This configuration therefore causes a problem in that the degree of freedom is low as to generatable crossword puzzles.

In view of this, if a plurality of words are placed one by one on a face of board where positions of black cells are not determined in advance, the plurality of words can thus be placed at a relatively high degree of freedom without restraint owing to the black cells. According to this configuration, however, if the plurality of words are simply placed one by one without thought, the plurality of words cannot be placed densely due to restriction owing to crossing characters and restriction owing to adjoining characters. Consequently, there is a possibility that the number of black cells increases in a crossword puzzle which is complete.

The present invention has been made to solve the foregoing problem. An object of the present invention is to allow generation of, with a high degree of freedom, a crossword puzzle where character strings are placed densely as much as possible on a face of board that has an arbitrary size and does not include black cells in an initial stage.

Solution to Problem

In order to achieve the foregoing object, according to the present invention, a crossword puzzle is generated by placing a plurality of character strings lengthwise and widthwise on a face of board that includes an arbitrary number of cells arranged in a lengthwise direction and a widthwise direction and does not include black cells in which no characters are filled, in an initial stage. The crossword puzzle is generated by executing processing of setting, in the face of board, a target area for placement of one character string made up of an arbitrary number of characters and placing, in the set target area, one character string made up of an arbitrary number of characters falling within an area length of the target area, repeatedly every one character string. In setting the target area, the target area is set at a position that secures a widest free area capable of placement of a next character string without restriction owing to an existing character in a crossing cell and restriction owing to an existing character in an adjoining cell, in a remaining area except the target area and an existing area where a character string has already been placed.

Advantageous Effects of Invention

According to the present invention configured as described above, a plurality of character strings are placed one by one on a face of board that does not include black cells in an initial stage. Therefore, a character string made up of an arbitrary number of characters can be placed at an arbitrary position at a high degree of freedom without restraint owing to black cells. Furthermore, according to the present invention, moreover, in placing one character string, a target area is set, which secures a widest free area free from restriction owing to an existing character in a crossing cell or an adjoining cell in placing a next character string, and one character string having an arbitrary length is then placed in the set target area. Therefore, character strings can be placed one by one while leaving a room for enlarging an area where a next character string is freely placeable, as much as possible. In addition, a larger number of character strings can be placed in the wide free area. According to the present invention, a crossword puzzle where character strings are placed densely as much as possible on a face of board having an arbitrary size can thus be generated at a high degree of freedom.

DESCRIPTION OF EMBODIMENTS

Figure 1:
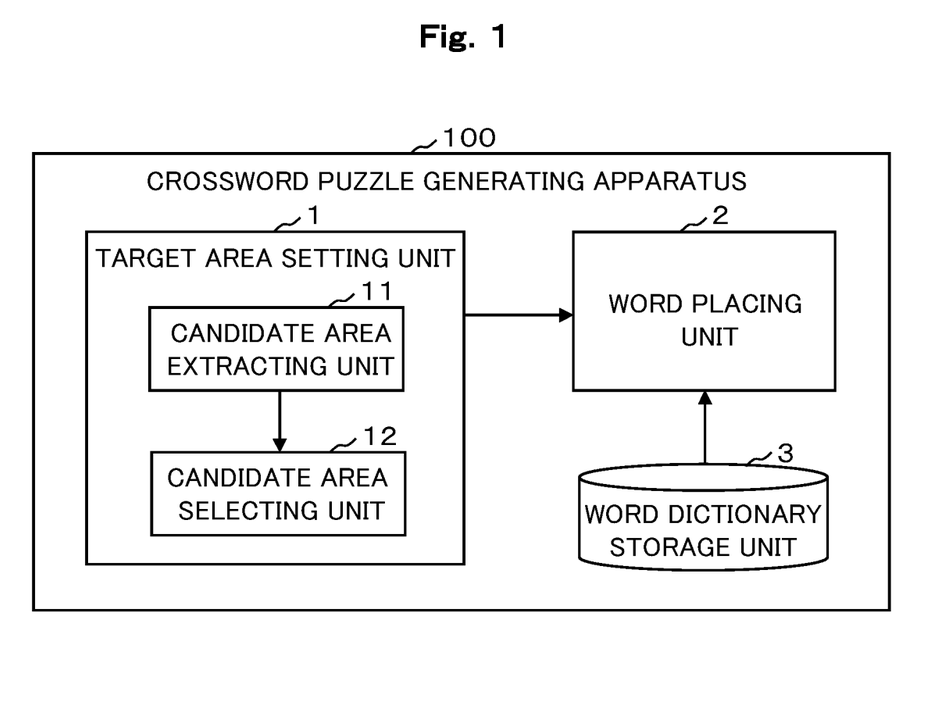
FIG. 1 is a block diagram illustrating an exemplary functional configuration of a crossword puzzle generating apparatus according to the present embodiment.

An embodiment of the present invention will be described below with reference to the drawings. FIG. 1 is a block diagram illustrating an exemplary functional configuration of a crossword puzzle generating apparatus 100 according to the present embodiment. As illustrated in FIG. 1, the crossword puzzle generating apparatus 100 according to the present embodiment includes a target area setting unit 1 and a word placing unit 2, as a functional configuration. The target area setting unit 1 includes a candidate area extracting unit 11 and a candidate area selecting unit 12, as a more specific functional configuration. The crossword puzzle generating apparatus 100 according to the present embodiment also includes a word dictionary storage unit 3 as a storage medium. The word placing unit 2 corresponds to a character string placing unit in the claims. A word dictionary stored in the word dictionary storage unit 3 corresponds to a character string dictionary in the claims.

The foregoing functional blocks 1 and 2 can be configured with any of hardware, digital signal processors (DSPs), and software. For example, in a case where the foregoing functional blocks 1 and 2 are configured with software, each of the functional blocks 1 and 2 actually includes a CPU, a RAM, a ROM, and the like of a computer, and is achieved by running a program stored in a storage medium such as a RAM, a ROM, a hard disk, or a semiconductor memory.

Figure 2:
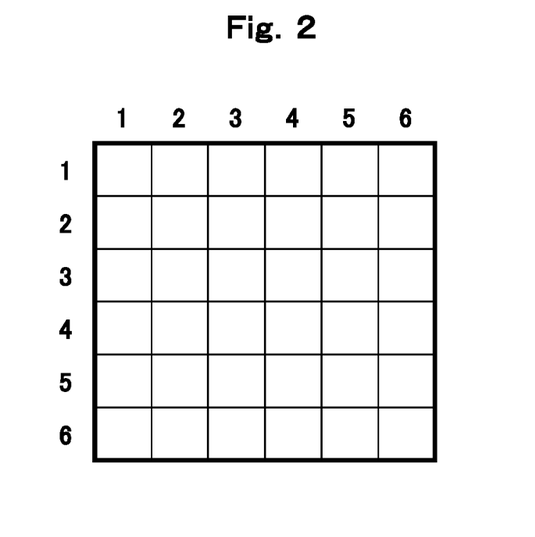
FIG. 2 is a diagram illustrating an exemplary face of board in an initial stage.

The crossword puzzle generating apparatus 100 according to the present embodiment generates a crossword puzzle by placing a plurality of words lengthwise and widthwise on a face of board that includes an arbitrary number of cells arranged in a lengthwise direction and a widthwise direction and does not include black cells in which no characters are filled, in an initial stage, as illustrated in FIG. 2. FIG. 2 illustrates a six-by-six face of board including six cells arranged in the lengthwise direction and six cells arranged in the widthwise direction; however, the face of board may include any number of cells. A user may optionally set each of the number of cells in the lengthwise direction and the number of cells in the widthwise direction. Limitation may be imposed on the minimum settable number of cells. Likewise, limitation may also be imposed on the maximum settable number of cells.

Characters to be placed on a face of board may be constituted of any of the alphabet, kanji, hiragana, katakana, or a combination thereof. In addition, other computer-compatible characters are applicable. A character string to be placed on a face of board may be any of a word, a phrase, and a sentence. In a phrase or a sentence written in alphabets, there is one space between two words. Such a space is expressed by a predetermined substitute character, and a series of continuous multiple characters including the substitute character is treated as one character string. In this case, the substitute character is treated as a character not crossing another character string. For ease of the following description, a word is used as a character string.

The word dictionary storage unit 3 stores a plurality of words each made up of an arbitrary number of characters (specifically, two or more characters). These words are associated with sentences indicating clues for getting answers in solving a complete crossword puzzle. In other words, the word dictionary storage unit 3 stores multiple sets of a word made up of an arbitrary number of characters and a sentence indicating a clue associated with the word.

The target area setting unit 1 sets, in the face of board, a target area for placement of one word made up of an arbitrary number of characters. In placing one word widthwise, a target area corresponds to a widthwise area in one row. In placing one word lengthwise, a target area corresponds to a lengthwise area in one column. In the present embodiment, a concept of a free area is introduced to set a target area so as to satisfy conditions concerning the free area. The free area refers to an area capable of placement of a word without restriction owing to an existing character in a cell crossing the area (hereinafter, such a cell will be referred to as a crossing cell) and restriction owing to an existing character in a cell adjoining the area (hereinafter, such a cell will be referred to as an adjoining cell).

Here, the restriction owing to the existing character in the crossing cell means that in a case where a target area is set at a position crossing an existing area where a word has already been placed, a word including the same character as an existing character in a crossing cell should be placed in the target area. The restriction owing to the existing character in the adjoining cell means that in a case where a target area is set at a position adjoining an existing area where a word has already been placed, a word connectable to an existing character in an adjoining cell should be placed in the target area. In other words, the free area refers to an area in which existing characters do not exist in the top, bottom, left, and right cells.

Figure 3:
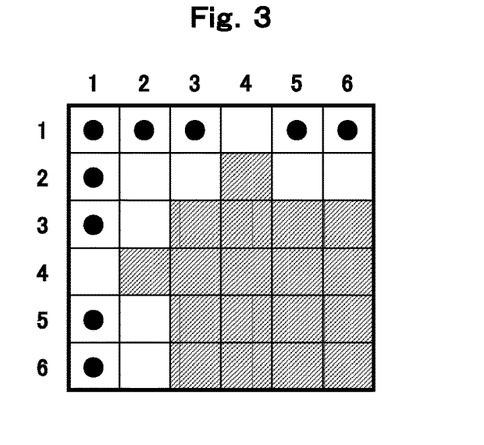
FIG. 3 is a diagram for explaining a concept of a free area.

FIG. 3 is a diagram for explaining the concept of the free area. In FIG. 3, a word is placed in cells indicated with black circles, and no word is placed in the remaining cells. In this case, the free area corresponds to a hatched area in the area where no word is placed.

The target area setting unit 1 sets the target area at a position that secures the widest free area capable of placement of a next word without the restriction owing to the existing character in the crossing cell and the restriction owing to the existing character in the adjoining cell, in the remaining area except the target area and the existing area where the word has already been placed.

Figure 4:
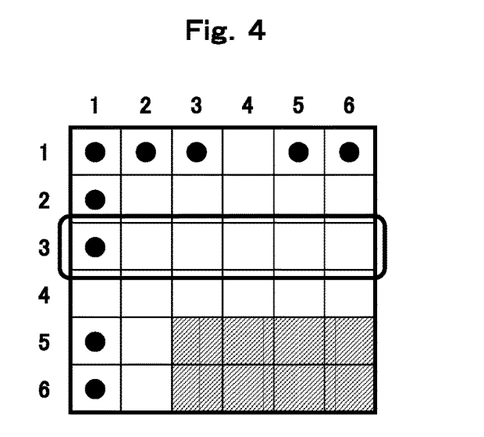
FIG. 4 is a diagram for explaining a concept of a next word free area.

FIG. 4 is a diagram for explaining "a free area capable of placement of a next word" (hereinafter, such a free area will be referred to as a next word free area). The next word free area corresponds to a next character string free area in the claims. Also in FIG. 4, a word is placed in cells indicated with black circles, and no word is placed in the remaining cells. A frame extended widthwise indicates a target area. The next word free area refers to a free area assumed on the assumption that characters are present in all the cells in the target area. In a case where the target area is set as illustrated in FIG. 4, a hatched area corresponds to the next word free area. The target area setting unit 1 searches for a place that secures the widest next word free area assumed as described above, and sets the place for the target area.

Specifically, the target area setting unit 1 sets the target area through processing by the candidate area extracting unit 11 and the candidate area selecting unit 12. The candidate area extracting unit 11 extracts, from the face of board, candidate areas as candidates for the target area. Here, the candidate area extracting unit 11 extracts, as the candidate areas, areas that satisfy a first condition and a second condition to be described below. The first condition is that all adjoining cells in a direction different from an area setting direction as viewed from blank cells in which no characters are set in an area (hereinafter, such blank cells will be referred to as intra-area blank cells) are blank cells. The second condition is that an existing word already placed in an existing area is not changed in accordance with placement of characters in the intra-area blank cells.

In the example illustrated in FIG. 4, the area setting direction corresponds to the widthwise direction (the row direction), and the direction different from the area setting direction corresponds to the lengthwise direction (the column direction). The intra-area blank cell refers to a cell that is not indicated with a black circle (a cell in which no character is present) among a plurality of cells in an area indicated with the frame extended widthwise. In FIG. 4, since the frame extended widthwise is set at the third row, the adjoining cells in the direction different from the area setting direction correspond to cells adjoining the intra-area blank cells lengthwise (cells from the second to sixth columns on the second and fourth rows). In the example illustrated in FIG. 4, these cells are blank cells; therefore, the first condition is satisfied.

Also in the example illustrated in FIG. 4, even when characters are placed in all the intra-area blank cells, existing words already placed in an existing area are not changed. Specifically, two existing words already placed widthwise on the first row and two existing words already placed lengthwise on the first column are not changed to other words due to the connection to characters to be placed in the intra-area blank cells. Therefore, the second condition is satisfied. Accordingly, the frame extended widthwise in FIG. 4 is extracted as one of candidate areas.

Figure 5:
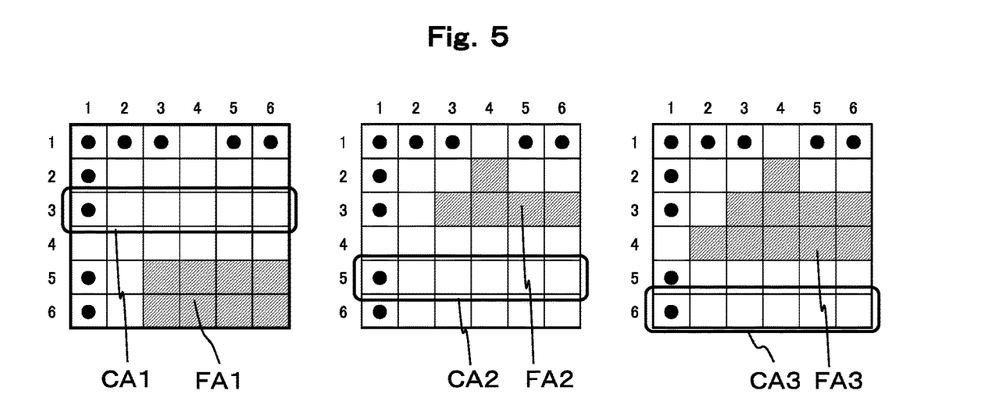
FIG. 5 is a diagram illustrating a plurality of candidate areas and a plurality of next word free areas corresponding thereto.

FIG. 5 is a diagram illustrating a plurality of candidate areas CA1, CA2, and CA3 extracted by the candidate area extracting unit 11 and a plurality of next word free areas FA1, FA2, and FA3 respectively resulting from the candidate areas CA1, CA2, and CA3. FIG. 5 illustrates a widthwise candidate area to be extracted in placing a next word after placement of words on the first row and first column. In particular, the first candidate area CA1 is the same as that illustrated in FIG. 4. Although not described in detail, each of the second candidate area CA2 and the third candidate area CA3 is also extracted as an area satisfying the foregoing first condition and second condition.

As illustrated in FIG. 5, the candidate area extracting unit 11 extracts, as a candidate area, a range that is securable maximum as long as the first condition and the second condition are satisfied. In addition, the candidate area extracting unit 11 extracts, as a candidate area, an area covering a plurality of cells including intra-area blank cells and a crossing cell crossing an existing area of the direction different from the area setting direction, except a state incapable of crossing a first one of the rows in the widthwise direction of the face of board and a first one of the columns in the lengthwise direction of the face of board.

Each of the three candidate areas CA1 to CA3 illustrated in FIG. 5 is extracted as a longest area covering five intra-area blank cells from the second column to the sixth column and a crossing cell crossing an existing area on the first column. With regard to the second row, only the cell on the fourth column (hereinafter, this cell will be referred to as a "cell (2, 4)" in some cases) corresponds to a cell satisfying the first condition and the second condition, so that an area covering two or more characters cannot be set. Therefore, no candidate area is extracted from the second row. With regard to the fourth row, each of the cells from the second column to the sixth column satisfies the first condition and the second condition, but does not include a crossing cell. Therefore, no candidate area is extracted from also the fourth row.

The candidate area selecting unit 12 selects a candidate area that secures a widest next word free area, from among the candidate areas extracted by the candidate area extracting unit 11, and sets the selected candidate area for a target area. In FIG. 5, hatched areas correspond to the next word free areas FA1, FA2, and FA3 respectively assumed from the candidate areas CA1, CA2, and CA3. In the example of FIG. 5, the next word free area FA3 assumed from the third candidate area CA3 is the widest area. Therefore, the candidate area selecting unit 12 sets the third candidate area CA3 for a target area.

In a case where there are multiple candidate areas each securing a widest next word free area, the candidate area selecting unit 12 randomly selects one from the multiple candidate areas, and sets the selected candidate area for a target area. In the case where there are multiple candidate areas each securing a widest next word free area, alternatively, the candidate area selecting unit 12 may set a candidate area having a longest area length for a target area, and here, in a case where there are multiple candidate areas each having a longest area length, the candidate area selecting unit 12 may randomly select one of the multiple candidate areas. Alternatively, in a case where the candidate area extracting unit 11 extracts candidate areas that are different in area length from one another, the candidate area selecting unit 12 may set a candidate area having a longest area length for a target area, without application of a condition for securing a widest next word free area, and here, in a case where there are multiple candidate areas each having a longest area length, the candidate area selecting unit 12 may set a candidate area securing a widest next word free area for the target area.

The word placing unit 2 places, in the target area set by the target area setting unit 1 (the candidate area selecting unit 12), one word made up of an arbitrary number of characters falling within the area length of the target area. In the present embodiment, the word placing unit 2 randomly extracts one word made up of an arbitrary number of characters falling within the area length of the target area set by the target area setting unit 1, from the word dictionary storage unit 3 in accordance with a generation probability distribution, and places the extracted one word in the target area. The condition, "in accordance with a generation probability distribution" means that a probability of extraction of words each made up of n characters (n≥2) accords with a ratio of the words each made up of n characters to all words stored in the word dictionary storage unit 3. For example, when a ratio of words each made up of two characters is 30%, a word made up of two characters is extracted with a probability of 30%.

In the present embodiment, the word placing unit 2 generates a regular expression in consideration of an area length of a target area and an existing character in the target area, extracts one word satisfying the regular expression from the word dictionary storage unit 3, and places the extracted one word in the target area. The details of the regular expression will be described later.

In the present embodiment, the target area setting unit 1 and the word placing unit 2 generate a crossword puzzle by preferentially processing the first row and the first column prior to the remaining area and, after execution of the processing, repeatedly performing setting of a target area and placement of one word on the remaining area while alternately switching between the lengthwise direction and the widthwise direction of the face of board. In the first one of the rows and the first one of the columns, exceptionally, setting of a target area and placement of one word are performed consecutively as much as possible.

Here, in the first one of the rows and the first one of the columns, exceptionally, the target area setting unit 1 sets an area satisfying the second condition for a target area, without application of the condition for securing a widest next word free area and without extraction of candidate areas. The word placing unit 2 then places one word made up of an arbitrary number of characters in the target area set by the target area setting unit 1. This processing is not executed while alternately switching the first row and the first column each time one word is placed. That is, setting of a target area and placement of one word are performed consecutively as much as possible in the first row, and then, setting of a target area and placement of one word are performed consecutively as much as possible in the first column.

In other words, in the first one of the rows, setting of a target area and placement of a word are performed consecutively until a free area (which is not a next word free area) in the first row no longer exists. Also in the first one of the columns, setting of a target area and placement of a word are performed consecutively until a free area in the first column no longer exists. The processing for the first row and the processing for the first column may be executed alternately until the respective free areas no longer exist as long as the first one of the rows and the first one of the columns are preferentially processed prior to the remaining area.

FIGS. 6 to 12 are diagrams illustrating a series of procedures for generating a crossword puzzle by the crossword puzzle generating apparatus 100 according to the present embodiment configured as described above. These figures each illustrate a regular expression under the face of board of the crossword puzzle, and each regular expression is generated when the word placing unit 2 places one word. FIGS. 6 to 12 illustrate procedures for generating a crossword puzzle by placing, for example, words made up of alphabets one by one.

Figure 6:
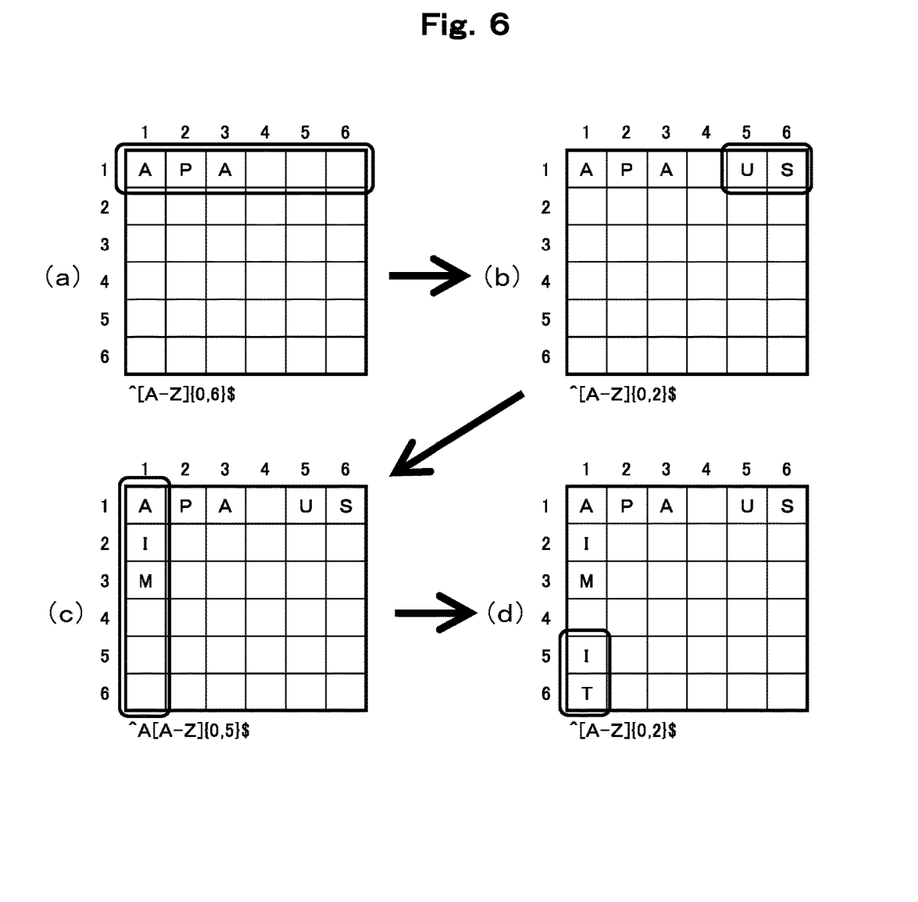
FIG. 6 is a diagram illustrating a series of procedures for generating a crossword puzzle.

As illustrated in FIG. 6(*a*), first, the target area setting unit 1 sets, for a target area, the longest area that covers the six cells on the first row, and the word placing unit 2 places, in the target area, one word made up of an arbitrary number of characters falling within the area length of the target area. At this time, the word placing unit 2 generates a regular expression of "^[A-Z]{0, 6} $". In this regular expression, the symbol "^" means that a character immediately after this symbol is the head of a character string. The portion "[A-Z]" means that any one of the characters between the cell brackets is extracted. The portion "{0, 6}" designates the minimum number of digits and the maximum number of digits of a character to be extracted. This case means that a word made up of characters ranging from zero characters or more to six characters or less is extracted. The symbol "$" means that a character immediately before this symbol is the end of a character string. FIG. 6(*a*) illustrates an exemplary case where three characters "APA" are placed, which are randomly extracted as a word that accords with "^ [A-Z] {0, 6} $" from the word dictionary storage unit 3 in accordance with the generation probability distribution.

As illustrated in FIG. 6(*b*), next, the target area setting unit 1 sets, for a target area, an area that covers two cells and becomes longest within a range not connecting to an existing word on the same row as the first row, while satisfying the second condition. The word placing unit 2 then places, in the target area, one word made up of two characters falling within the area length of the target area. At this time, the word placing unit 2 generates a regular expression of "^[A-Z] {0, 2}$". FIG. 6(*b*) illustrates an exemplary case where two characters "US" are placed, which are randomly extracted as a word that accords with "^[A-Z] {0, 2} $" from the word dictionary storage unit 3.

As illustrated in FIG. 6(*c*), next, the target area setting unit 1 sets, for a target area, the longest area that covers the six cells on the first column, and the word placing unit 2 places, in the target area, one word made up of an arbitrary number of characters falling within the area length of the target area. At this time, the word placing unit 2 generates a regular expression of "^A [A-Z] {0,5}$". In the case of FIG. 6(*c*), "^A" is inserted in the head of the regular expression so as to extract a word connecting at its head to the character "A" placed in the cell (1,1). FIG. 6(*c*) illustrates an exemplary case where three characters "AIM" are placed, which are randomly extracted as a word that accords with "^A [A-Z] {0, 5} $" from the word dictionary storage unit 3 in accordance with the generation probability distribution.

As illustrated in FIG. 6(*d*), next, the target area setting unit 1 sets, for a target area, an area that covers two cells and becomes longest within a range not connecting to an existing word on the same column as the first column immediately before. The word placing unit 2 then places, in the target area, one word made up of two characters falling within the area length of the target area. At this time, the word placing unit 2 generates a regular expression of "^[A-Z] {0, 2} $". FIG. 6(*d*) illustrates an exemplary case where two characters "IT" are placed, which are randomly extracted as a word that accords with "^ [A-Z] {0, 2} $" from the word dictionary storage unit 3.

Figure 7:
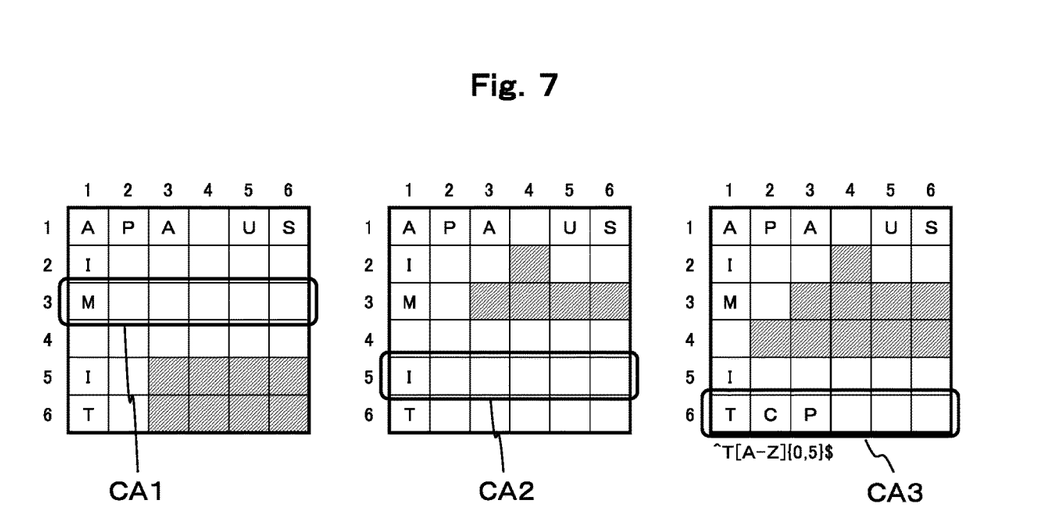
FIG. 7 is a diagram illustrating a series of procedures for generating the crossword puzzle.

As illustrated in FIG. 7, next, the target area setting unit 1 extracts three widthwise candidate areas CA1 to CA3 and sets, for a target area, the third candidate area CA3 that secures a widest next word free area, from among the candidate areas CA1 to CA3. The word placing unit 2 then places, in the target area, one word made up of an arbitrary number of characters falling within the area length of the target area. At this time, the word placing unit 2 generates a regular expression of "^T [A-Z] {0, 5}$". FIG. 7 illustrates an exemplary case where three characters "TCP" are placed, which are randomly extracted as a word that accords with "^T [A-Z] {0, 5} $" from the word dictionary storage unit 3 in accordance with the generation probability distribution.

Figure 8:
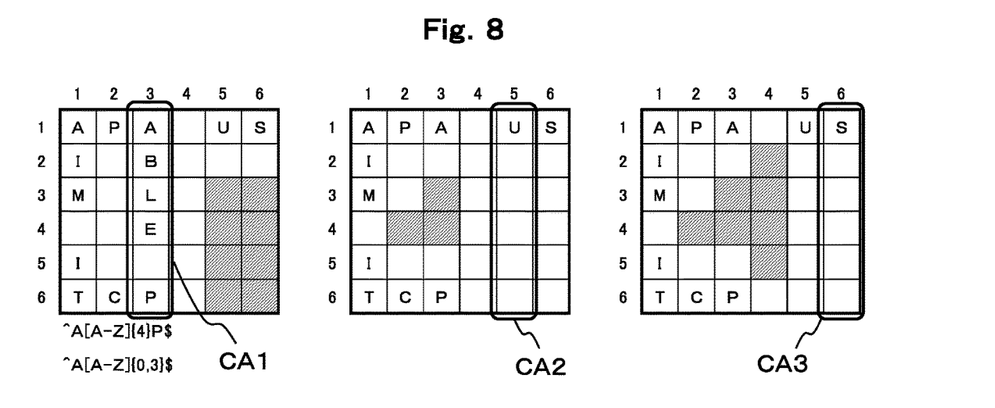
FIG. 8 is a diagram illustrating a series of procedures for generating the crossword puzzle.

As illustrated in FIG. 8, next, the target area setting unit 1 extracts three lengthwise candidate areas CA1 to CA3 and sets, for a target area, the first candidate area CA1 that secures a widest next word free area, from among the candidate areas CA1 to CA3. The word placing unit 2 then places, in the target area, one word made up of an arbitrary number of characters falling within the area length of the target area. FIG. 8 illustrates an exemplary case where a regular expression of "^A [A-Z] {4} P$" is generated first, a word made up of "A" as the first character, arbitrary characters from "A" to "Z" as the second to fourth characters, and "P" as the sixth character is not found as a result of a search in the word dictionary storage unit 3, a regular expression of "^A [A-Z] {0, 3} $" is generated for searching for the word again, and four characters "ABLE" of which the first character is "A" are thus randomly extracted from the word dictionary storage unit 3 in accordance with the generation probability distribution, and are placed.

Note that, if a word of which the first character is "A" is not found, a regular expression of "^ [A-Z] {0, 3} P$" is generated to search for a word that is made up of four characters or less and of which the last character is "P" again. If a word that is made up of four characters or less and of which the last character is "P" is not found, the third candidate area CA3 that secures a second widest next word free area is set for a target area again, and then one word made up of an arbitrary number of characters is placed in the target area.

Figure 9:
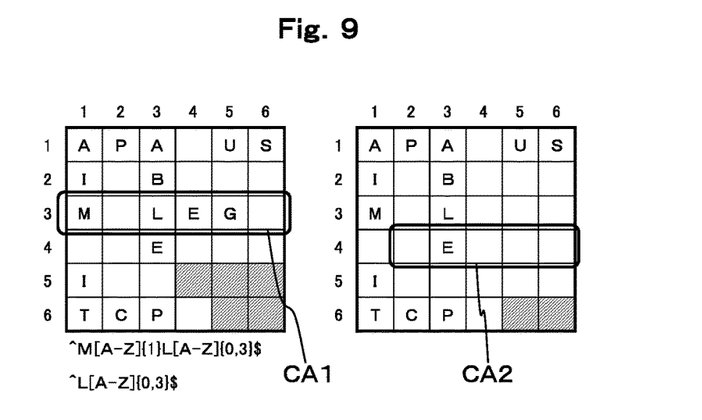
FIG. 9 is a diagram illustrating a series of procedures for generating the crossword puzzle.

As illustrated in FIG. 9, next, the target area setting unit 1 extracts two widthwise candidate areas CA1 and CA2 and sets, for a target area, the first candidate area CA1 that secures a widest next word free area, from between the candidate areas CA1 and CA2. The word placing unit 2 then places, in the target area, one word made up of an arbitrary number of characters falling within the area length of the target area. At the stage illustrated in FIG. 9, an existing character is present in the cell (4,3); therefore, an area that covers five cells and is securable maximum on the fourth row is extracted as the second candidate area CA2. However, the first candidate area CA1 that secures a widest next word free area is set for a target area.

FIG. 9 illustrates an exemplary case where, with regard to the first candidate area CAL set for a target area, a regular expression of "^M[A-Z] {1} L[A-Z] {0, 3} $" is generated first, a word made up of "M" as the first character and "L" as the third character is not found as a result of a search in the word dictionary storage unit 3, a regular expression of "^L[A-Z] {0, 3} $" is generated for searching for the word again, and three characters "LEG" are thus randomly extracted from the word dictionary storage unit 3 in accordance with the generation probability distribution, and are placed.

Figure 10:
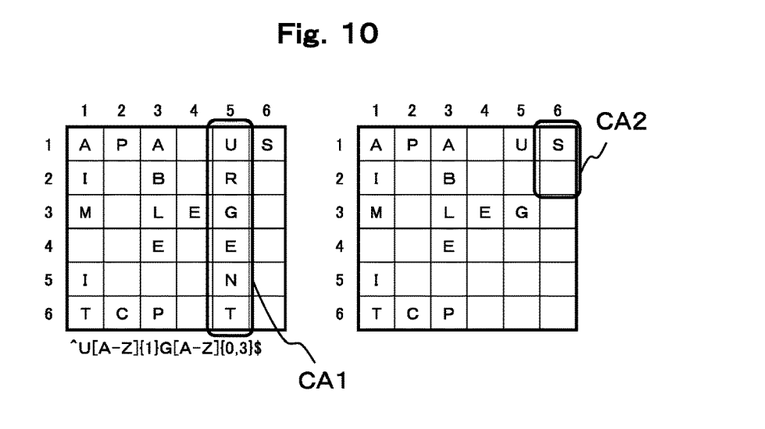
FIG. 10 is a diagram illustrating a series of procedures for generating the crossword puzzle.

As illustrated in FIG. 10, next, the target area setting unit 1 extracts two lengthwise candidate areas CA1 and CA2 and sets, for a target area, the first candidate area CA1 from between the candidate areas CA1 and CA2. The word placing unit 2 then places, in the target area, one word made up of an arbitrary number of characters falling within the area length of the target area. FIG. 10 illustrates an exemplary case where since the two candidate areas CA1 and CA2 thus extracted are largely different in area length from each other, the first candidate area CA1 having the longest area length is set for a target area without application of the condition for securing a widest next word free area. FIG. 10 illustrates an exemplary case where six characters "URGENT" are placed, which are randomly extracted as a word that accords with a regular expression of "^U[A-Z]{1}G[A-Z] {0, 3} $" from the word dictionary storage unit 3 in accordance with the generation probability distribution.

Figure 11:
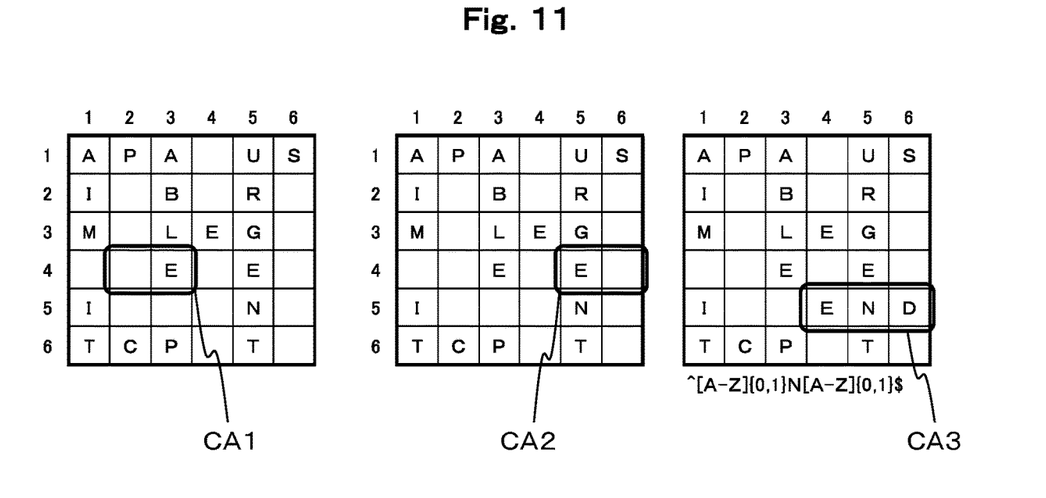
FIG. 11 is a diagram illustrating a series of procedures for generating the crossword puzzle.

As illustrated in FIG. 11, next, the target area setting unit 1 extracts three widthwise candidate areas CA1 to CA3 and sets, for a target area, the third candidate area CA3 from among the candidate areas CA1 to CA3. The word placing unit 2 then places, in the target area, one word made up of an arbitrary number of characters falling within the area length of the target area. In FIG. 11, no next word free area results from all the candidate areas CA1 to CA3; therefore, the third candidate area CA3 having the longest area length is set for a target area. FIG. 11 illustrates an exemplary case where three characters "END" are placed, which are randomly extracted as a word that accords with a regular expression of "~ [A-Z] {0, 1} N [A-Z] {0,1} $" from the word dictionary storage unit 3 in accordance with the generation probability distribution.

In FIG. 11, the maximum area that covers all the cells from end to end of the face of board in the area setting direction is not extracted as a candidate area. In this case, the crossword puzzle may be regarded as being completed at the time when a word is placed in a target area set in a candidate area. In order to place words more densely, preferably, setting of a target area and placement of a word are performed continuously as long as a candidate area is present even when the maximum area is not extracted as a candidate area.

Figure 12:
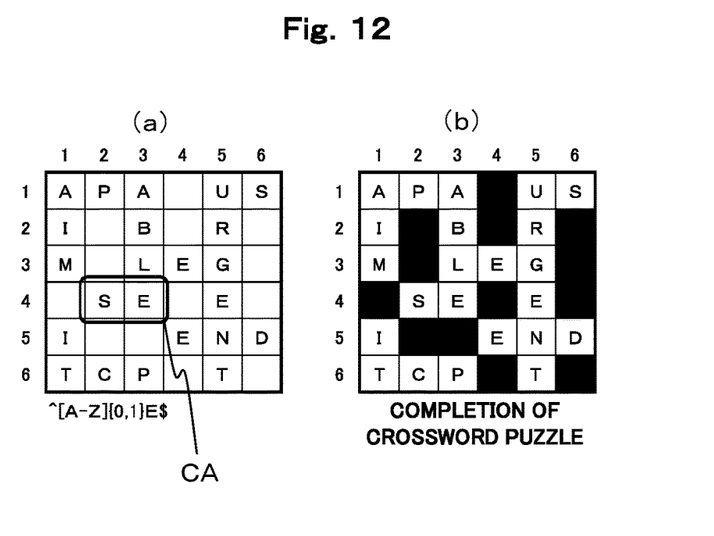
FIG. 12 is a diagram illustrating a series of procedures for generating the crossword puzzle.

FIG. 12 illustrates a state in which after the placement of the word in the widthwise target area as illustrated in FIG. 11, a lengthwise candidate area is tried to be extracted, but cannot be extracted, and then a widthwise candidate area is tried to be extracted, so that one widthwise candidate area CA is extracted. In this case, the target area setting unit 1 sets the extracted candidate area CA for a target area. The word placing unit 2 then places, in the target area, one word made up of two characters falling within the area length of the target area. FIG. 12(*a*) illustrates an exemplary case where two characters "SE" are placed, which are randomly extracted as a word that accords with a regular expression of "^[A-Z]{0,1} ES" from the word dictionary storage unit 3.

Note that, the crossword puzzle may be regarded as being completed at the time when no candidate area is extracted in one of the area setting directions. In order to place words more densely, preferably, extraction of a candidate area is further performed in the other area setting direction as illustrated in FIG. 12(*a*). It can be considered that the crossword puzzle is completed at the time when no candidate area is extracted also in the other area setting direction.

After the placement of the two characters "SE" as illustrated in FIG. 12(*a*), lengthwise and widthwise candidate areas are tried to be extracted, but are not extracted. As illustrated in FIG. 12(*b*), then, the remaining cells in which no word is placed at the stage illustrated in FIG. 12(*a*) are set for black cells. The crossword puzzle is thus completed.

As described in detail above, according to the present embodiment, a crossword puzzle is generated by placing a plurality of words lengthwise and widthwise on a face of board that includes an arbitrary number of cells arranged in a lengthwise direction and a widthwise direction and does not include black cells in which no characters are filled, in an initial stage. The crossword puzzle is generated by executing processing of setting, in the face of board, a target area for placement of one word made up of an arbitrary number of characters and placing, in the set target area, one word made up of an arbitrary number of characters falling within an area length of the target area, repeatedly every one word. In setting the target area, the target area is set at a position that secures a widest next word free area, in a remaining area except the target area and an existing area where a word has already been placed.

According to the present embodiment configured as described above, a plurality of words are placed one by one on a face of board that does not include black cells in an initial stage. Therefore, a word made up of an arbitrary number of characters can be placed at an arbitrary position at a high degree of freedom without restraint owing to black cells. According to the present embodiment, moreover, in placing one word, a target area is set, which secures a widest next word free area. One word having an arbitrary length is then placed in the set target area. Therefore, words can be placed one by one while leaving a room for enlarging an area where a next word is freely placeable, as much as possible. In addition, a larger number of words can be placed in the wide free area. According to the present embodiment, a crossword puzzle where words are placed densely as much as possible on a face of board having an arbitrary size can thus be generated at a high degree of freedom.

Furthermore, according to the present embodiment, a first one of the rows and a first one of the columns are preferentially processed prior to the remaining area. In the first row and the first column, setting of a target area and placement of a word are performed until a free area no longer exists. Therefore, in the processing for the remaining area after the processing for the first row and first column, the number of candidate areas to be extracted as an area covering a crossing cell can be increased as much as possible. As a result, a candidate area securing a widest next word free area can be set for a target area, from among a large number of candidate areas. This configuration increases a possibility that a target area can be set at a more suitable position.

Furthermore, according to the present embodiment, a range that is securable maximum as long as the first condition and the second condition are satisfied is extracted as a candidate area. Therefore, a target area can be set such that a word made up of a larger number of characters can be placed. This configuration enables reduction in number of black cells finally left without placement of a word, as much as possible, to thereby generate a crossword puzzle where words are placed more densely.

Furthermore, according to the present embodiment, a word having the same length as the area length of a set target area is not placed in the set target area, but a word randomly extracted from the word dictionary storage unit 3 in accordance with the generation probability distribution is placed in the set target area. As a result, a word having a length shorter than the area length of the set target area is placed in the set target area in some cases. This configuration therefore allows a room for further placement of another word to be left in the set target area. This configuration thus enables generation of a crossword puzzle where a larger number of words are placed.

Figure 13:
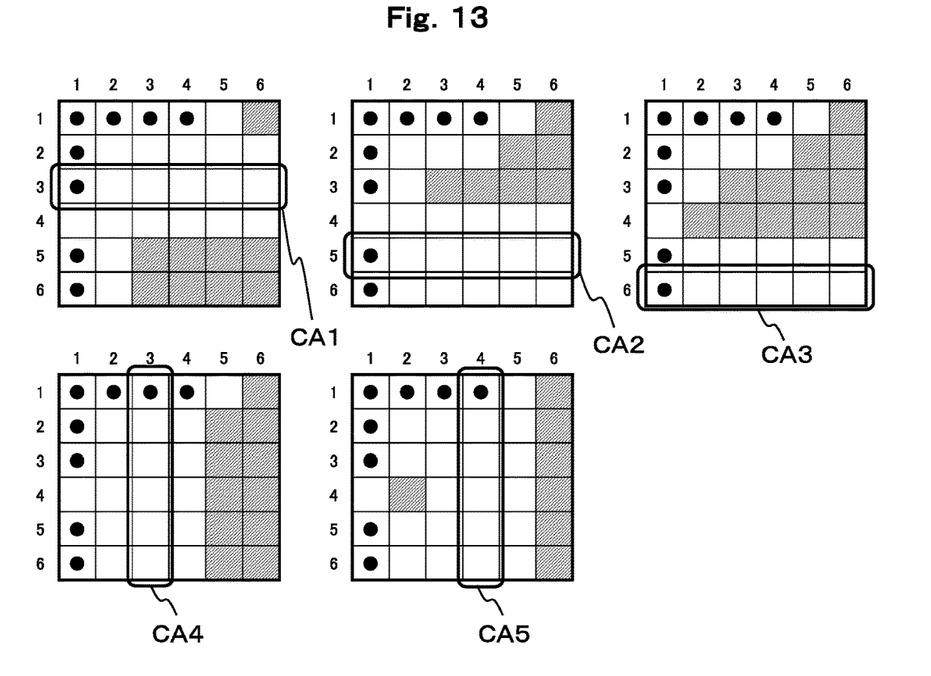
FIG. 13 is a diagram illustrating a modified example concerning a candidate area extracting method.

The foregoing embodiment has described the example of preferentially processing a first one of the rows and a first one of the columns prior to the remaining area, and then repeatedly performing setting of a target area and placement of one word on the remaining area while alternately switching between the lengthwise direction and the widthwise direction of the face of board; however, the present invention is not limited to this example. For example, the first one of the rows and the first one of the columns are preferentially processed prior to the remaining area, and then setting of a target area and placement of one word may be performed repeatedly on the remaining area while randomly switching between the lengthwise direction and the widthwise direction of the face of board. As an exemplary method of randomly switching between the lengthwise direction and the widthwise direction, candidate areas CA1 to CA5 may be extracted in both the lengthwise direction and the widthwise direction at once, and a candidate area securing a widest next word free area may be set for a target area, from among the extracted candidate areas CA1 to CA5, as illustrated in FIG. 13.

The foregoing embodiment has also described the example of setting a target area only on the second condition without application of the condition for securing a widest next word free area in the first one of the rows and the first one of the columns; however, the present invention is not limited to this example. For example, also in the first one of the rows and the first one of the columns, a candidate area may be extracted and a target area may be set on the condition for securing a widest next word free area, as in the remaining area. This case also brings about the same result as that in the case where a target area is set without application of the condition for securing a widest next word free area.

In the foregoing embodiment, if two or more continuous blank cells are obtained in preferentially processing the first row and the first column prior to the remaining area, setting of a target area and placement of a word may be performed again.

The foregoing embodiment has also described the example of preferentially processing the first row and the first column prior to the remaining area; however, the present invention is not limited to this example. For example, the lowermost row and the rightmost column may be preferentially processed prior to the remaining area, in addition to the first row and the first column.

The foregoing embodiment has also described the example of regarding a crossword puzzle as being completed when candidate areas extractable in accordance with the first condition and the second condition no longer exist; however, the present invention is not limited to this example. For example, in a case where a ratio of black cells left without placement of a word upon completion of a crossword puzzle to all the cells on the face of board is equal to or more than a predetermined value, the target area setting unit 1 and the word placing unit 2 may perform setting of a target area and placement of one word again from the beginning. The crossword puzzle may be regarded as being completed when the ratio of the black cells to all the cells on the face of board becomes less than the predetermined value.

Figure 14:
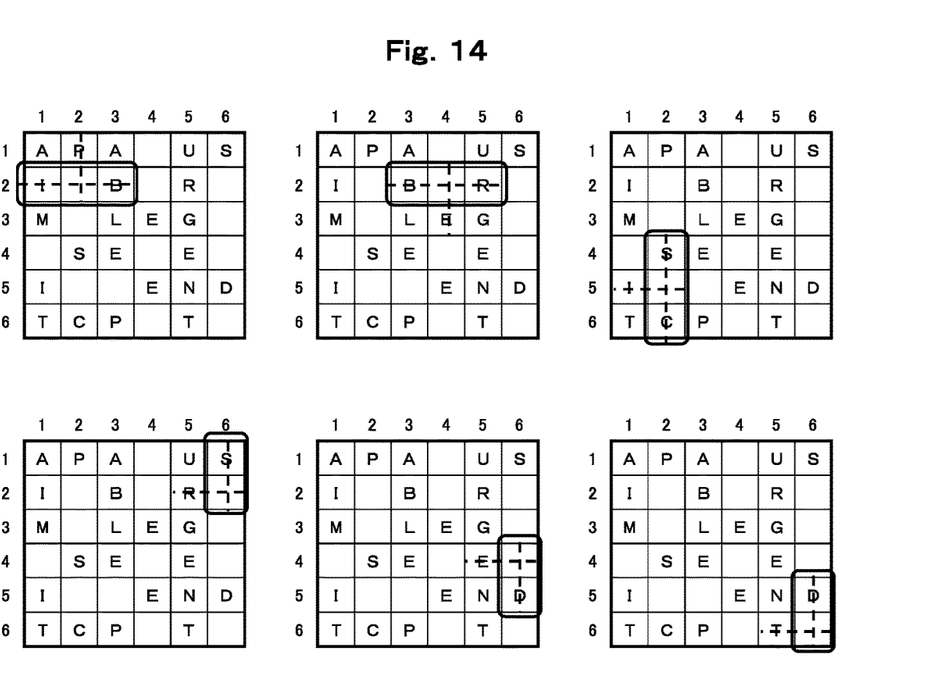
FIG. 14 is a diagram illustrating a modified example concerning the candidate area extracting method.

Alternatively, when candidate areas extractable in accordance with the first condition and the second condition no longer exist, as illustrated in FIG. 14, candidate areas may be further extracted in such a manner that the first condition is alleviated to allow a situation in which only one of adjoining cells in the direction different from the area setting direction as viewed from intra-area blank cells is not a blank cell. Since a next word free area no longer exists at this time, a target area is randomly set from among the extracted candidate areas, and a word is placed in the target area. In this case, in addition to generating a regular expression in the area setting direction, another regular expression is further generated in the direction different from the area setting direction with regard to an adjoining cell in which an existing character is present, and a word satisfying both the regular expressions is extracted from the word dictionary storage unit 3. This processing is repeatedly executed until a candidate area cannot be extracted completely. This configuration enables reduction in number of black cells finally left without placement of a word, as much as possible, to thereby generate a crossword puzzle where a larger number of words are placed.

The foregoing embodiment has also described the example of, in the case where the candidate area extracting unit 11 extracts candidate areas that are different in area length from one another, setting a candidate area having a longest area length for a target area. In contrast to this, a candidate are having a shortest area length may be set for a target area. In this case, a word made up of a smaller number of characters is placed, which may increase a possibility that a larger number of words are placed in the face of board as a whole.

The foregoing embodiment has also described the example of extracting, as a candidate area, an area covering a plurality of cells including intra-area blank cells and a crossing cell crossing an existing area; however, the present invention is not limited to this example. For example, an area not covering a crossing cell may be extracted as a candidate area, in addition to an area covering a crossing area. For example, in the situation illustrated in FIG. 5, the area from the second to sixth columns on the fourth row, which satisfies the first condition and the second condition, may be extracted as one of candidate areas.

Also in a case where the candidate area not covering the crossing cell is set for a target area and one word is placed in the target area, there is a possibility that a word crossing the word placed in this target area is placed subsequently. In a case where the candidate area not covering the crossing cell is set for a target area and a word is placed in the target area, and thereafter, an isolated state in which a word crossing the word is not placed continues predetermined times, the isolated word may be deleted. Alternatively, in a case where a word placed in a target area, for which a candidate area not covering a crossing cell is set, is left in an isolated state in which the word does not cross another word after words are placed in all the rows and all the columns, the isolated word may be deleted, and the processing by the target area setting unit 1 including extraction of a candidate area and the processing by the word placing unit 2 may be executed again.

In a case where both an area covering a crossing cell and an area not covering a crossing cell are extractable as candidate areas, the candidate area covering the crossing cell may be preferentially set for a target area irrespective of the size of a next word free area.

The foregoing and other embodiments are merely exemplary in implementing the present invention; therefore, the technical scope of the present invention is not limitedly interpreted by these embodiments. That is, the present invention can be implemented in various forms without departing from the gist or main features thereof.

REFERENCE SIGNS LIST

1 target area setting unit
2 word placing unit (character string placing unit)
3 word dictionary storage unit (character string dictionary)
11 candidate area extracting unit
12 candidate area selecting unit
100 crossword puzzle generating apparatus

The invention claimed is:

1. A crossword puzzle generating apparatus for generating a crossword puzzle by placing a plurality of character strings lengthwise and widthwise on a face of board that includes an arbitrary number of cells arranged in a lengthwise direction and a widthwise direction and does not include black cells in which no characters are filled, in an initial stage, the crossword puzzle generating apparatus comprising:
a target area setting unit that sets, in the face of board, a target area for placement of one character string made up of an arbitrary number of characters; and
a character string placing unit that places, in the target area set by the target area setting unit, one character string made up of an arbitrary number of characters falling within an area length of the target area, wherein
the target area setting unit sets the target area at a position that secures a widest next character string free area as a free area capable of placement of a next character string without restriction owing to an existing character in a crossing cell and restriction owing to an existing character in an adjoining cell, in a remaining area except the target area and an existing area where a character string has already been placed, and
the crossword puzzle is generated by executing processing by the target area setting unit and processing by the character string placing unit, repeatedly every one character string.

2. The crossword puzzle generating apparatus according to claim 1, wherein
the target area setting unit includes:
a candidate area extracting unit that extracts, from the face of board, candidate areas as candidates for the target area; and
a candidate area selecting unit that selects a candidate area securing the widest next character string free area, from among the candidate areas extracted by the candidate area extracting unit, and sets the selected candidate area for the target area, and
the candidate area extracting unit extracts, as the candidate area, an area satisfying a first condition that all adjoining cells in a direction different from an area setting direction as viewed from intra-area blank cells corresponding to blank cells in which no characters are set in an area are blank cells, and a second condition that the existing character string already placed in the existing area is not changed in accordance with placement of characters in the intra-area blank cells.

3. The crossword puzzle generating apparatus according to claim 2, wherein
the candidate area extracting unit extracts, as the candidate area, an area covering a plurality of cells including the intra-area blank cells and a crossing cell corresponding to a cell crossing the existing area of the direction different from the area setting direction, except a state incapable of crossing a first one of rows in the widthwise direction of the face of board and a first one of columns in the lengthwise direction of the face of board.

4. The crossword puzzle generating apparatus according to claim 3, wherein
in the first one of the rows and the first one of the columns, exceptionally, the target area setting unit sets an area satisfying the second condition for the target area, without application of a condition for securing the widest next character string free area and without extraction of the candidate areas.

5. The crossword puzzle generating apparatus according to claim 4, wherein
the candidate area extracting unit extracts, as the candidate area, a range that is securable maximum as long as the first condition and the second condition are satisfied.

6. The crossword puzzle generating apparatus according to claim 4, wherein
the target area setting unit and the character string placing unit preferentially process the first one of the rows and the first one of the columns prior to the remaining area and, after execution of the processing on the first one of the rows and the first one of the columns, repeatedly execute setting of the target area and placement of the one character string on the remaining area while alternately switching between the lengthwise direction and the widthwise direction of the face of board.

7. The crossword puzzle generating apparatus according to claim 4, wherein
the target area setting unit and the character string placing unit preferentially process the first one of the rows and the first one of the columns prior to the remaining area and, after execution of the processing on the first one of the rows and the first one of the columns, repeatedly execute setting of the target area and placement of the one character string on the remaining area while randomly switching between the lengthwise direction and the widthwise direction of the face of board.

8. The crossword puzzle generating apparatus according to claim 3, wherein
the target area setting unit and the character string placing unit preferentially process the first one of the rows and the first one of the columns prior to the remaining area and, after execution of the processing on the first one of the rows and the first one of the columns, repeatedly execute setting of the target area and placement of the one character string on the remaining area while alternately switching between the lengthwise direction and the widthwise direction of the face of board.

9. The crossword puzzle generating apparatus according to claim 8, wherein
in a case where cells left without placement of a character string upon completion of the crossword puzzle are set for the black cells, and a ratio of the black cells to all the cells of the face of board is equal to or more than a predetermined value, the target area setting unit and the character string placing unit execute setting of the target area and placement of the one character string again from the beginning.

10. The crossword puzzle generating apparatus according to claim 3, wherein
the target area setting unit and the character string placing unit preferentially process the first one of the rows and the first one of the columns prior to the remaining area and, after execution of the processing on the first one of the rows and the first one of the columns, repeatedly execute setting of the target area and placement of the one character string on the remaining area while randomly switching between the lengthwise direction and the widthwise direction of the face of board.

11. The crossword puzzle generating apparatus according to claim 3, wherein
the candidate area extracting unit extracts, as the candidate area, a range that is securable maximum as long as the first condition and the second condition are satisfied.

12. The crossword puzzle generating apparatus according to claim 2, wherein
the candidate area extracting unit extracts, as the candidate area, a range that is securable maximum as long as the first condition and the second condition are satisfied.

13. The crossword puzzle generating apparatus according to claim 12, wherein
in a case where the plurality of candidate areas extracted by the candidate area extracting unit include a plurality of the candidate areas each securing the widest next character string free area, the candidate area selecting unit sets, for the target area, a candidate area having a longest area length among the plurality of the candidate areas.

14. The crossword puzzle generating apparatus according to claim 12, wherein
in a case where the candidate area extracting unit extracts candidate areas that are different in area length from one another, the candidate area selecting unit sets a candidate area having a longest area length for the target area without application of a condition for securing the widest next character string free area.

15. The crossword puzzle generating apparatus according to claim 12, wherein
the character string placing unit randomly extracts one character string made up of an arbitrary number of characters falling within the area length of the target area set by the target area setting unit, from a character string dictionary in accordance with a generation probability distribution, and places the extracted one character string in the target area.

16. The crossword puzzle generating apparatus according to claim 15, wherein
in a case where cells left without placement of a character string upon completion of the crossword puzzle are set for the black cells, and a ratio of the black cells to all the cells of the face of board is equal to or more than a predetermined value, the target area setting unit and the character string placing unit execute setting of the target area and placement of the one character string again from the beginning.

17. The crossword puzzle generating apparatus according to claim 2, wherein
the candidate area extracting unit extracts, as the candidate areas, a range that is securable maximum as long as the first condition and the second condition are satisfied; among an area covering a plurality of cells including the intra-area blank cells and a crossing cell corresponding to a cell crossing the existing area of the direction different from the area setting direction, and an area covering a plurality of cells including the intra-area blank cells and not including the crossing cell.

18. The crossword puzzle generating apparatus according to claim 17, wherein
in a case where the candidate area selecting unit selects a candidate area not covering the crossing cell and sets the candidate area for the target area, the character string placing unit places a character string in the target area, and then the character string placed in the target area not covering the crossing cell is left in an isolated state in which the character string does not cross another character string even after the processing by the target area setting unit and the processing by the character string placing unit are repeatedly executed predetermined times or even after the processing by the target area setting unit and the processing by the character string placing unit are executed on all rows and columns, the isolated character string is deleted, and the processing by the target area setting unit and the processing by the character string placing unit are executed again.

19. A crossword puzzle generating method for generating a crossword puzzle by placing a plurality of character strings lengthwise and widthwise on a face of board that includes an arbitrary number of cells arranged in a lengthwise direction and a widthwise direction and does not include black cells in which no characters are filled, in an initial stage, the crossword puzzle generating method comprising:

a first step of setting, in the face of board, a target area for placement of one character string made up of an arbitrary number of characters, the first step being carried out by a target area setting unit of a computer; and a second step of placing, in the target area set by the target area setting unit, one character string made up of an arbitrary number of characters falling within an area length of the target area, the second step being carried out by a character string placing unit of the computer, wherein the target area setting unit sets the target area at a position that secures a widest next character string free area as a free area capable of placement of a next character string without restriction owing to an existing character in a crossing cell and restriction owing to an existing character in an adjoining cell, in a remaining area except the target area and an existing area where a character string has already been placed, and the crossword puzzle is generated by executing processing in the first step by the target area setting unit and processing in the second step by the character string placing unit, repeatedly every one character string.

* * * * *